US010590957B2

(12) United States Patent
Theux et al.

(10) Patent No.: US 10,590,957 B2
(45) Date of Patent: Mar. 17, 2020

(54) TURBINE ENGINE COMPRESSOR, IN PARTICULAR FOR AN AIRCRAFT TURBOPROP ENGINE OR TURBOJET ENGINE

(71) Applicant: Safran Aircraft Engines, Paris (FR)

(72) Inventors: Axel Theux, Moissy-Cramayel (FR); Pierre-Alain Francis Claude Sebrecht, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 486 days.

(21) Appl. No.: 15/279,666

(22) Filed: Sep. 29, 2016

(65) Prior Publication Data
US 2017/0241436 A1   Aug. 24, 2017

(30) Foreign Application Priority Data
Sep. 30, 2015  (FR) ..................... 15 59246

(51) Int. Cl.
*F04D 29/56* (2006.01)
*F01D 17/16* (2006.01)
(Continued)

(52) U.S. Cl.
CPC ......... *F04D 29/563* (2013.01); *F01D 17/162* (2013.01); *F04D 29/522* (2013.01); *F04D 29/542* (2013.01); *Y02T 50/671* (2013.01)

(58) Field of Classification Search
CPC .... F04D 29/563; F04D 29/522; F04D 29/542; F01D 17/162; Y02T 50/671; F05D 2250/90
(Continued)

(56) References Cited

U.S. PATENT DOCUMENTS

| 3,861,822 A | 1/1975 | Wanger |
| 4,295,784 A | 10/1981 | Manning |

(Continued)

FOREIGN PATENT DOCUMENTS

| FR | 1393812 A | 3/1965 |
| FR | 3015594 A1 | 6/2015 |

(Continued)

OTHER PUBLICATIONS

Machine Translation of RU 2145391 [retrieved on Mar. 20, 2019]. Retrieved from: Espacenet.*

*Primary Examiner* — Kenneth J Hansen
*Assistant Examiner* — Eric J Zamora Alvarez
(74) *Attorney, Agent, or Firm* — Blank Rome LLP

(57) ABSTRACT

A turbine-engine compressor, in particular for an aircraft turboprop engine or turbojet engine, comprising an annular casing and at least one annular row of variable-pitch blades, each blade comprising a radially external end comprising a pivot mounted in an orifice in the casing and connected by a link to a control ring able to pivot axially about its axis with respect to the casing. Each link comprises a first end fixed to the pivot of the blade and a second end mounted so as to be able to pivot on the control ring. The pivot axes of first and second links on the control ring are offset from each other along the axis of the compressor, the second end of the second link being mounted on the ring by a connecting member, allowing a connection of the sliding or annular linear pivot type.

3 Claims, 6 Drawing Sheets

(51) Int. Cl.
   *F04D 29/54*   (2006.01)
   *F04D 29/52*   (2006.01)
(58) Field of Classification Search
   USPC .......................................... 415/160
   See application file for complete search history.

(56) References Cited

U.S. PATENT DOCUMENTS

| | | | | |
|---|---|---|---|---|
| 5,316,438 | A * | 5/1994 | Tubbs | F01D 17/162 |
| | | | | 415/118 |
| 5,993,152 | A * | 11/1999 | Schilling | F01D 17/162 |
| | | | | 415/155 |
| 7,850,421 | B2 * | 12/2010 | Battig | F01D 17/162 |
| | | | | 415/160 |
| 7,938,620 | B2 * | 5/2011 | Bouru | F01D 17/162 |
| | | | | 415/160 |
| 8,087,883 | B2 * | 1/2012 | Bouru | F04D 29/563 |
| | | | | 415/160 |

FOREIGN PATENT DOCUMENTS

JP   2004-100553 A   4/2004
RU   2145391 C1   2/2000

* cited by examiner

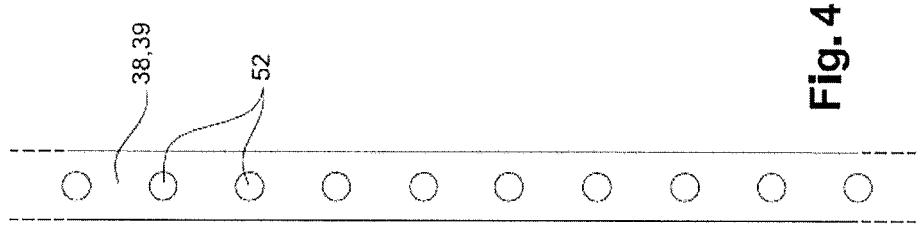
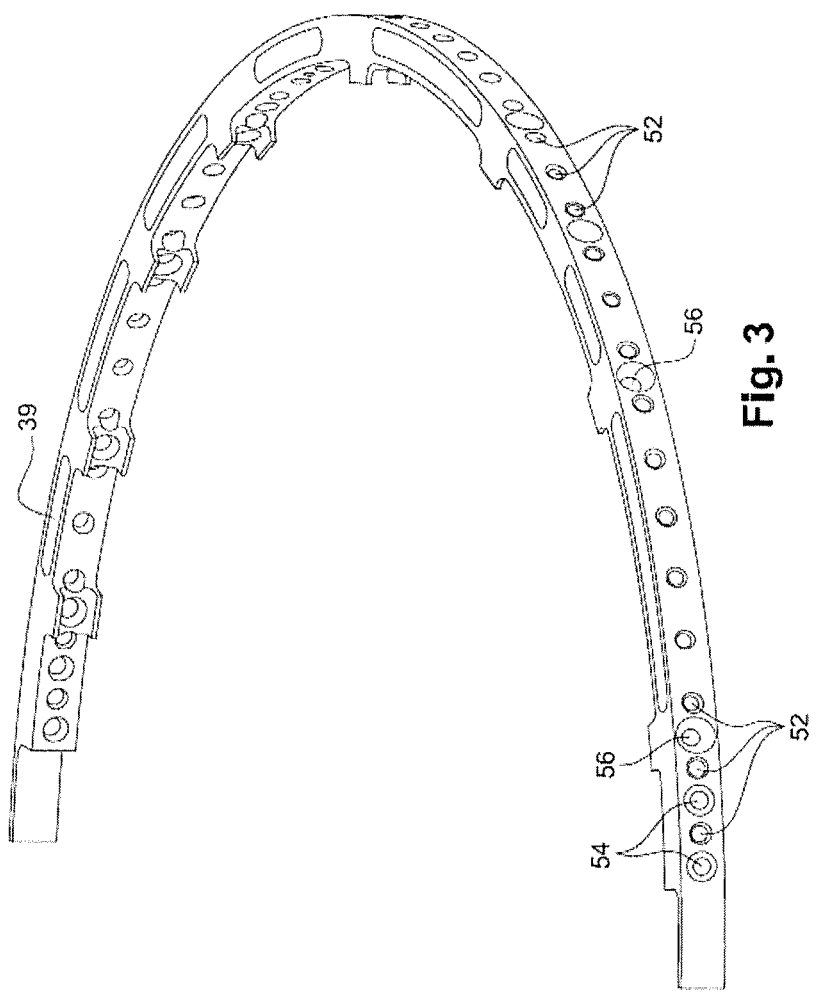

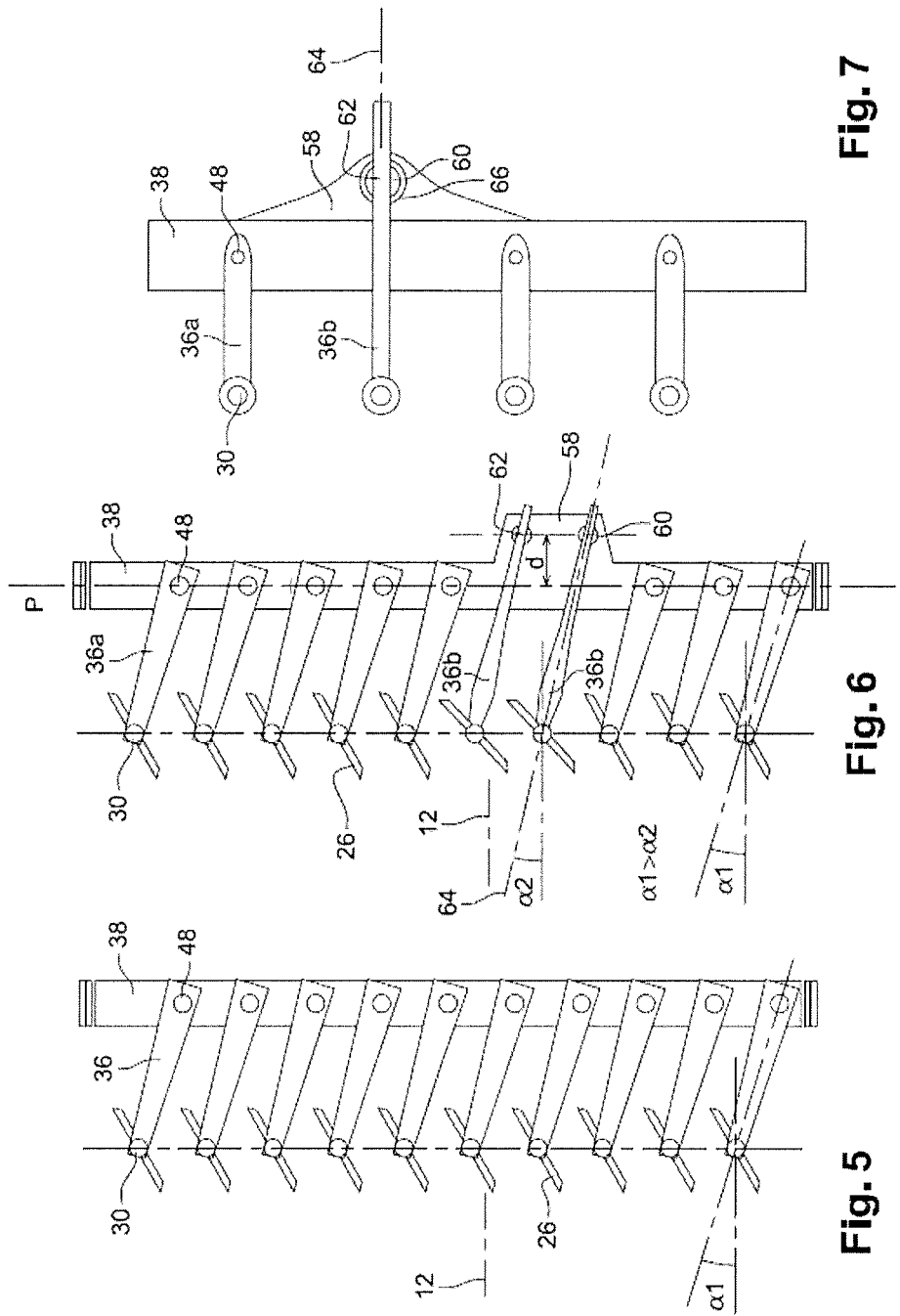

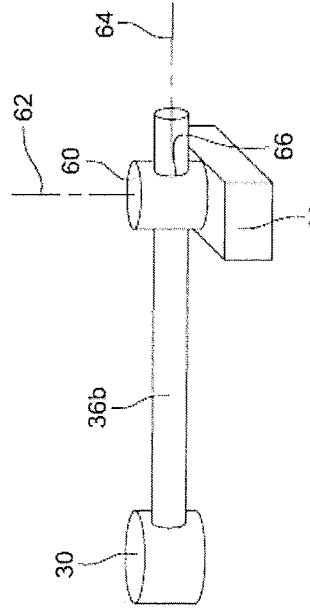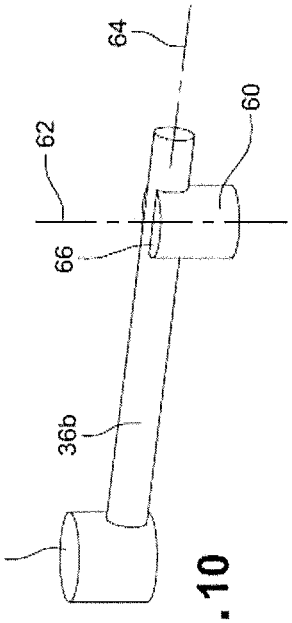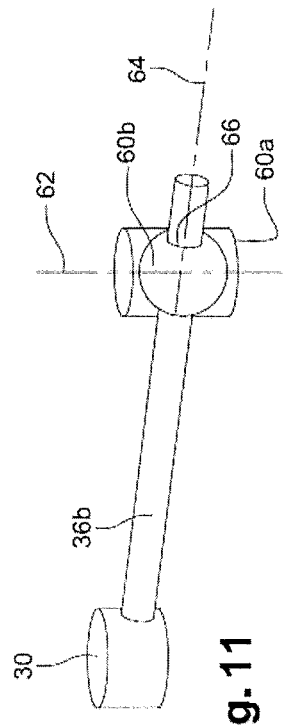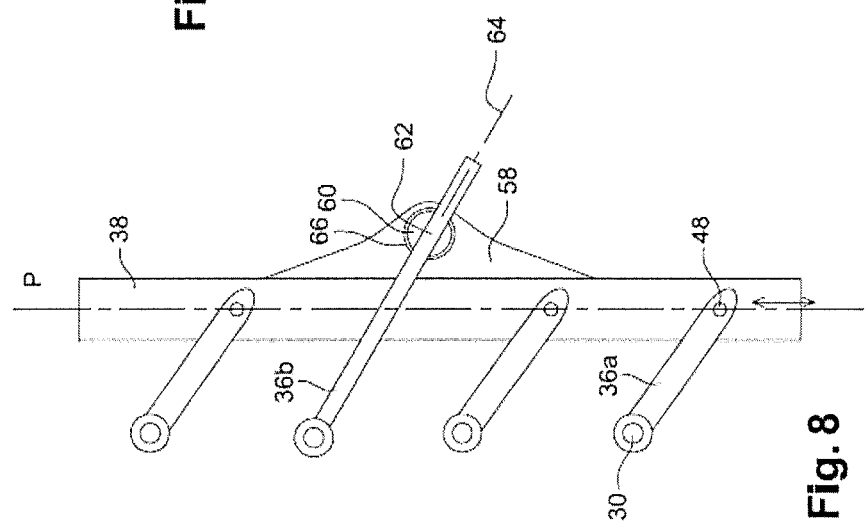

TURBINE ENGINE COMPRESSOR, IN PARTICULAR FOR AN AIRCRAFT TURBOPROP ENGINE OR TURBOJET ENGINE

BACKGROUND OF THE INVENTION

1. Field of the Invention

The present invention relates to a turbine engine compressor, in particular for an aircraft turboprop engine or turbojet engine.

2. Description of the Related Art

In a known fashion, a turbine engine compressor comprises a plurality of compression stages each comprising an annular row of movable blades mounted on a rotor shaft and an annular row of variable-pitch stator blades mounted at their radially external ends on a substantially cylindrical external casing.

Adjusting the angular pitch of the stator blades in a turbine engine is intended to optimise the efficiency and operability of the compressor at every point of operation of the turbine engine.

Variable-pitch stator blades each comprise, at their radially external end, a radial pivot that is centred and rotationally guided in an orifice of the external casing. Each blade pivot is connected by a link to a control ring that extends around the external casing of the compressor and can be moved in rotation about the longitudinal axis of the compressor by actuation means to transmit a rotation movement to the blades about axes of their pivots.

Each link is fixed to the blade pivot and comprises a cylindrical pin engaged in a cylindrical hole in the control ring.

When the control ring is rotated about its axis, it causes the pivoting of the links and blades about the pivot axis of the blades. The total angular range of rotation of the links is conventionally around 40° to 70°. The ring can also be moved axially so as to accompany the path of the pins. All the blades are then situated in the same angular position, for a given angular position of the control ring.

However, according to the operating speed of the turbine engine, there exists a need to be able to adapt the pitch of the blades according in particular to their azimuthal position, that is to say the circumferential position of the stator blade in the corresponding stage. The pitch angles making it possible to maximise the efficiency of the turbine engine may be different according to the azimuthal positions of the stator blades in the same stage.

This is because the flow of gas flowing in the duct passing through the high-pressure compressor is not homogenous over its entire circumference, this flow being able to comprise pockets generating losses of performance. Moreover, when the turbine engine is functioning at high speed, high forces and torques are exerted on the blades, which has a tendency to slightly deform the control ring.

The U.S. Pat. No. 3,861,822 discloses a turbine engine comprising a compressor equipped with means for adjusting the blades making it possible to position groups of blades at different pitch angles. Such adjustment means do however have a complex structure, requiring the use of numerous parts, which increases the weight and cost of such a turbine engine.

The patent application FR 3 015 594, in the name of the Applicant, discloses a turbine-engine compressor, in particular for an aircraft turboprop engine or turbojet engine, comprising a stator comprising an annular casing and at least one annular row of variable-pitch blades. Each blade comprises a radially external end comprising a pivot mounted in an orifice of the casing and connected by a link to a control ring able to pivot axially with respect to the casing, said link comprising a first end fixed to the pivot of the blade and a second end comprising a pin engaged in a hole in the control ring. The control ring more particularly makes a helical movement about the casing. At least one of the holes in the control ring, serving for engagement of the pins of the links, is oblong in shape and extends in the circumferential direction so as to allow movement of the pin in said oblong hole when the control ring rotates.

In this way, according to the form of the hole, it is possible to adapt the pitch angle of each blade, individually or by groups of blades, while keeping links having the same length. This adaptation makes it possible to adapt to the heterogeneity of the flow of gas and to correct any deformations at high engine speed, while avoiding static indeterminacy of the system.

The plays formed between the pins of the links and the oblong holes in the ring may cause vibrations, which may cause premature wear on the assembly. Moreover, the various oblong holes must be machined rigorously, otherwise the kinematics of the various movable elements may be disturbed. Such machining is relatively difficult to perform.

SUMMARY OF THE INVENTION

The purpose of the invention is in particular to remedy these drawbacks, in a simple, effective and inexpensive manner.

To this end, it proposes a turbine-engine compressor, in particular for an aircraft turboprop engine or turbojet engine, comprising an annular casing and at least one annular row of variable-pitch blades, each blade comprising a radially external end comprising a pivot mounted in an orifice in the casing and connected by a link to a control ring able to pivot axially about its axis with respect to the casing, each link comprising a first end fixed to the pivot of the blade and a second end mounted pivotally on the control ring, characterised in that the pivot axes of at least one first and one second link are offset from each other along the axis of the compressor, the second end of the second link being mounted on the ring by means of a connecting member and allowing a connection of the sliding or annular linear pivot type.

The axial offset makes it possible to adapt the pitch angles of the blades concerned, individually or by groups of blades. Such a feature makes it possible to adapt to the heterogeneity of the gas flow. The sliding or annular linear pivot connection makes it possible to avoid static indeterminacy of the system.

The pivot connection allows translation along an axis, here the axis of the second end of the second link, and a rotation about this same axis. The annular linear connection allows translation along an axis, here the axis of the second end of the second link, and three rotations. The annular linear connection thus combines a translation and a swivel. More generally, the invention allows a single translation along the axis of the second end of the second link and at least one rotation, namely at least the rotation about the aforementioned axis.

According to one embodiment, the pivot axis of the second end of the second link is offset axially upstream with respect to the pivot axis of the second end of the first link, in the direction of flow of the gases in the compressor.

According to another embodiment, the pivot axis of the second end of the second link is offset axially downstream with respect to the pivot axis of the second end of the first link, in the direction of flow of the gases in the compressor.

Furthermore, the circumferential distance between the pivot axis of the first end of the first link and the pivot axis of the second end of the first link may be different from the circumferential distance between the pivot axis of the first end of the second link and the pivot axis of the second end of the second link.

Moreover, the connecting member may be able to pivot about a substantially radial axis with respect to the ring, the second end of the second link comprising a rectilinear sliding part engaged in a recess of complementary shape in said connecting member so as to allow sliding of said rectilinear part with respect to said connecting member.

In this case, the recess may be a hole passing through said connecting member.

In a variant, the recess may be a groove passing along said connecting member.

The connecting member may comprise a first part mounted pivotally with respect to the ring and a second part mounted so as to swivel with respect to the first part, the recess being provided in the second part.

The invention also relates to a turbine engine, in particular an aircraft turboprop engine or turbojet engine, comprising at least one compressor of the aforementioned type.

BRIEF DESCRIPTION OF THE DRAWINGS

The invention will be understood better and other details, features and advantages of the invention will emerge from a reading of the following description given by way of non-limitative example with reference to the accompanying drawings, in which:

FIG. 3 is a perspective view of a part of a control ring,

FIG. 4 is a schematic plan view of a region of the control ring illustrated in FIG. 3, FIG. 5 is a schematic plan view of the control ring, links and blades of the compressor of the prior art, FIG. 6 is a view corresponding to FIG. 5, illustrating a first embodiment of the invention, FIGS. 7 and 8 are views of a part of the control ring and links, in two different positions, illustrating the functioning of the first embodiment of the invention, FIGS. 9 to 11 are schematic views in perspective each illustrating a link and a connecting member, said figures showing different variant embodiments.

DETAILED DESCRIPTION OF THE PREFERRED EMBODIMENTS

Hereinafter, the terms "upstream" and "downstream" are defined with respect to the direction of flow of the gases in the turbine engine, in particular in the secondary duct. Likewise, the terms "radial" and "axial" are defined with respect to the axis of the turbine engine.

Figure 1:
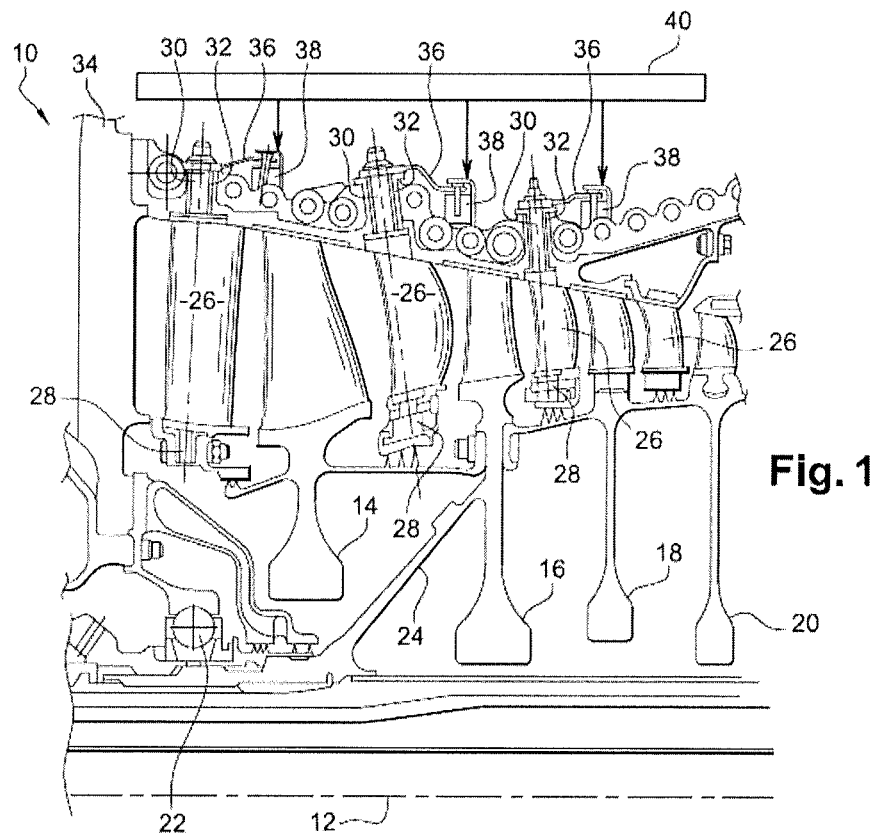
FIG. 1 is a partial schematic half-view in axial section of a high-pressure compressor of a turbojet engine equipped with a variable-pitch blade control system according to the prior art.

Reference is made first of all to FIG. 1, which depicts a schematic half-view of the upstream part of a high-pressure compressor 10 according to the prior art, in cross section along a plane passing through the axis 12 of the turbine engine. The high-pressure compressor 10 comprises a rotor, of axis 12, that is to say identical to that of the turbine engine, formed by discs 14, 16, 18, 20 assembled axially on one another, the rotor being in abutment on a bearing 22 by means of a journal 24.

Each disc is arranged downstream of an annular row of variable-pitch stator blades 26. Each stator blade comprises coaxial cylindrical pivots 28, 30 at its radially internal and external ends. The internal cylindrical pivot 28 extends towards the inside from the stator blade 26 and is centred and rotationally guided in a cylindrical housing of an annular element of the stator, and the external cylindrical pivot 30 extends radially towards the outside and is centred and rotationally guided in a cylindrical tube 32 of a substantially cylindrical external casing 34 of the high-pressure compressor 10.

The angular pitch of the stator blades 26 of a stage is adjusted by means of links 36 that are rotated by a control ring 38 mounted so as to pivot with respect to the casing 34 about the axis 12. The total movement of the control ring is for example between 5° and 20°. A hydraulic actuator 40 allows the simultaneous rotational movement of a plurality of control rings 38. The ring 38 is for example formed by two parts 39 connected to each other by means of bridges (not shown) fixed to the ends of said parts 39.

Figure 2:
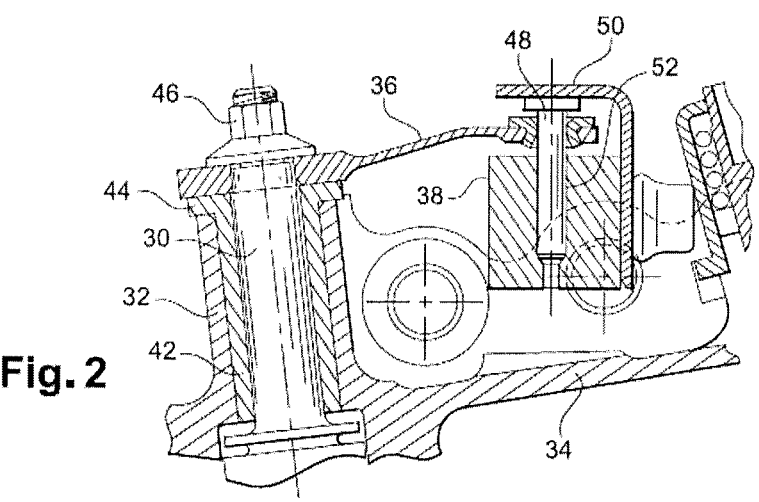
FIG. 2 is a schematic view in axial section to a larger scale of the system for the angular adjustment of a stage of the compressor in FIG. 1.

The links 36 are fixed by one end to the radial pivots 30 of the variable-pitch blades 26, these pivots 30 being rotationally guided in sleeves 42 mounted in the tubes 32 of the casing 34 (FIG. 2). The end of the link fixed to the blade pivot 30 is held radially on a rim 44 of the sleeve 42 by a nut 46 screwed to the end of the pivot 30. The other end of the link 36 comprises an orifice in which a radial cylindrical pin 48 mounted in a cylindrical hole 52 of the control ring 38 is rotationally guided. The pins 48 are held in position by angled lugs 50 fixed to the control ring 38. The control ring 38 can also be moved axially in translation, so as to accompany the circular path of the pins 48.

As can be seen better in FIG. 3, the parts 39 of the control ring 38 comprise other holes 54, 56 used respectively for fixing elements for connecting the ends of the two parts 39 of the control member 38 together or used for fixing centring shoes coming to be applied to a track provided on the external surface of the casing.

When the control ring 38 is rotated about its axis 12, it causes the pivoting of the links 36 and blades 26 about the axis of the pivots 28, 30 of the blades 26. All the blades 26 are then in the same angular position, for a given angular position of the control ring 38, the links 36 all having the same length.

However, as indicated previously, according to the operating speed of the turbine engine, there exists a need to be able to adapt the pitch of the blades 26 according in particular to their azimuthal position, that is to say the circumferential position of the stator blade 26 in the corresponding stage.

FIGS. 6 to 8 depict a first embodiment of the invention aimed at responding to this need.

In this embodiment, some of the links, bearing the reference 36a, have the structure described previously, while other links, bearing the reference 36b and with a length different from the links 36a, have an end that is connected to the control ring 38 by a connection of the sliding pivot type.

The control ring 38 extends circumferentially and has a radial plane P passing through the centres of the holes 52 and of the pins or pivots 48. At least one region of the ring 38 comprises a protrusion 58 extending axially, here downstream, from the plane P, at least one connecting member 60 being mounted so as to pivot about a radial axis 62 on said protrusion 58. The axial distance d between the plane P and each rotation axis 62 is for example between 1 and 30 mm.

The links 36b extend along an axis 64 and each comprise an end mounted so as to be able to slide along the axis 64 of the link 36b in a recess 66 of complementary shape of the connecting member 60, so as to form said sliding pivot connection between each link 36b and the control ring 38. The use of such sliding means makes it possible to prevent any static indeterminacy of the assembly.

FIG. 9 illustrates a first embodiment of such a sliding connection in which the recess 66 is a hole, for example cylindrical, through which a part of the link 36 with a complementary shape passes.

FIG. 10 illustrates a second embodiment of such a sliding connection in which the recess 66 is a groove, for example a groove with a semi-cylindrical shape, in which a part of the link 36b with a complementary shape is slidably mounted.

The advantage is to make it possible to limit the bending force undergone by the link 36b during the helical movement of the ring while allowing a movement of the link 36b with respect to the groove 66 and possibly emerging very slightly from this groove.

FIG. 11 illustrates a third embodiment in which the connecting member comprises a first part 60a mounted so as to be able to pivot about the axis 62 with respect to the ring 38 and a second spherical part 60b mounted so as to swivel in a housing of complementary shape in the first part 60a, the recess 66 being formed by a hole passing through the second part 60b. Said hole 66 has a part of the link 36b with a complementary shape pass through it.

As illustrated in FIG. 6, the axial offset of the rotation axis 62 of the links 36b on the ring 38 with respect to the rotation axis 48 of the links 36a on the ring 38 tends to modify the pitch angle α2 of the links 36b with respect to the pitch angle α1 of the links 36a.

The pitch angle α1, α2 of the links 36a, 36b is the angle formed by the axis of the link 36a, 36b with the axis 12 of the turbine engine. It will be noted that the pitch angle of the blades 26 fixedly attached to the links 36a, 36b is directly dependent on the pitch angles α1, α2 of said links 36a, 36b and varies in the same way as the angles α1, α2.

In the case of such a downstream offset, the pitch angle α2 is less than the pitch angle α1, in absolute values, whatever the angular position of the ring 38.

Figure 12:
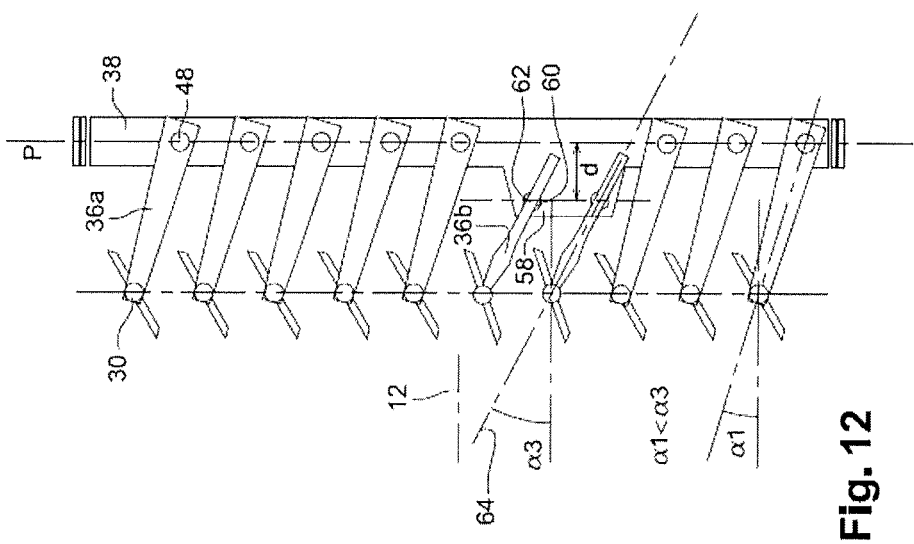
FIG. 12 is a view corresponding to FIG. 5, illustrating a second embodiment of the invention.

FIG. 12 illustrates a second embodiment of the invention, which differs from the one disclosed with reference to FIGS. 6 to 11 in that the rotation axes 62 of the links 36b are offset not downstream with respect to the plane P passing through the rotation axes 48 of the links 36a, but upstream. To this end, the protrusions 58 extend axially upstream. As before, the axial distance d between the plane P and each rotation axis 62 is for example between 1 and 30 mm.

In such an embodiment, the pitch angle α3 of the links 36b is greater than the pitch angle α1 of the links 36a, in absolute values, whatever the angular position of the ring 38.

Figure 13:
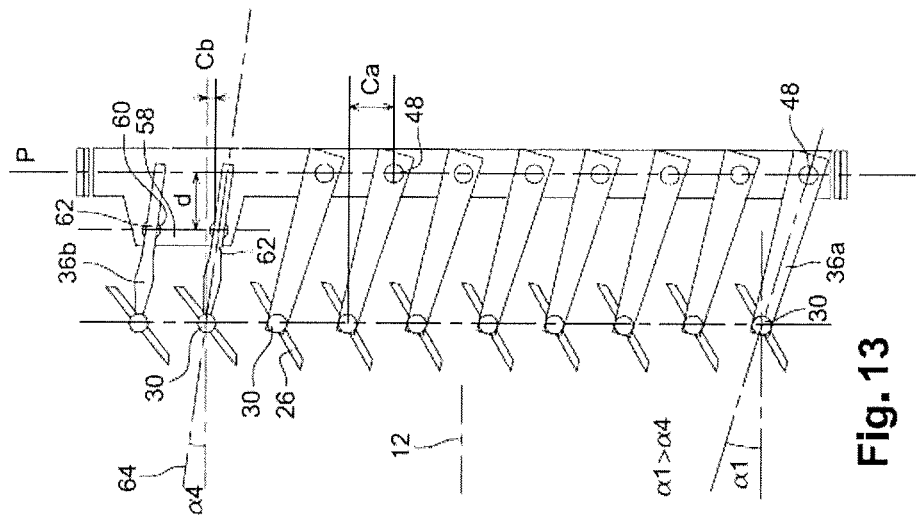
FIG. 13 is a view corresponding to FIG. 5, illustrating a third embodiment of the invention.

FIG. 13 illustrates a third embodiment, which differs from the one disclosed with reference to FIG. 12 in that the rotation axes 62 of the links 36b are offset upstream with respect to the plane P passing through the rotation axes 48 of the links 36a, and in that the circumferential distance cb between the centre of the pivot 30 and the rotation axis 62 of each link 36b is different from the circumferential distance ca between the centre of the pivot 30 and the rotation axis 48 of each link 36a. In the embodiment depicted in FIG. 13, the distance cb is less than the distance ca and is such that the pitch angle α4 of the blades 36b is less than the pitch angle α1 of the blades 36a, whatever the angular position of the ring 38.

The invention thus makes it possible to vary the pitch angle of at least some of the links in order to compensate for the heterogeneity of the flow of gas flowing in the duct passing through the high-pressure compressor.

Figure 14:
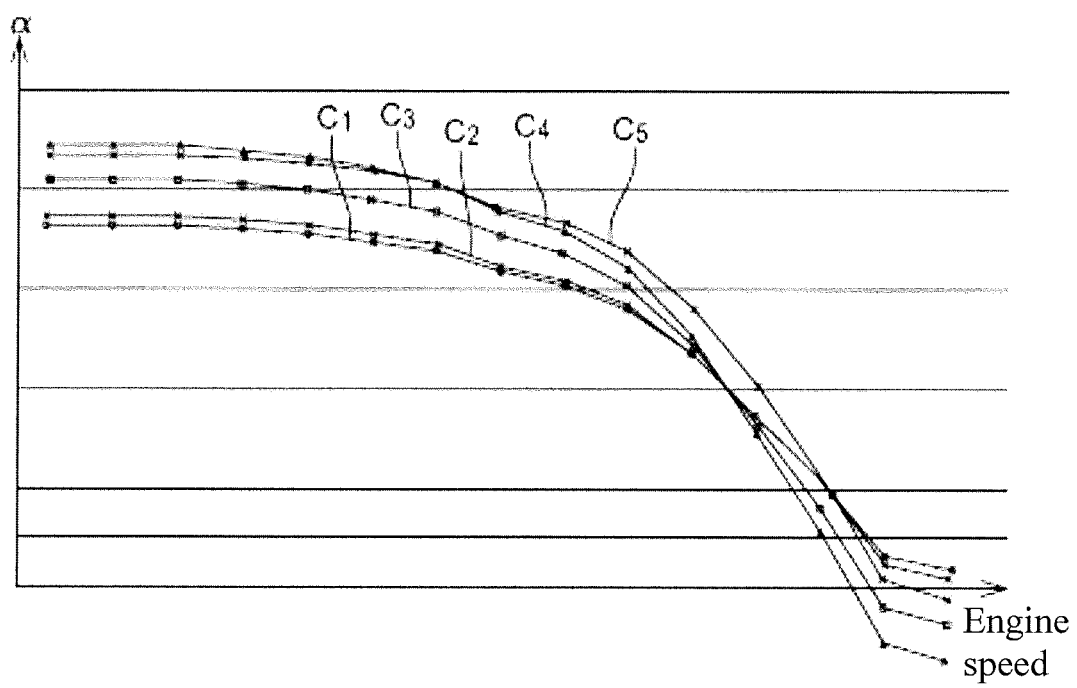
FIG. 14 is a diagram depicting various pitch laws for different variant embodiments of the invention and for a turbine engine of the prior art.

FIG. 14 is a diagram showing the change in the pitch laws for various embodiments, this diagram comprising five curves referenced C1 to C5.

The curve C1 illustrates the pitch law, that is to say the change in the pitch angle of the links 36a or of the links 36 of the prior art, for which the rotation axes 48 are not offset axially from the plane P.

The curves C2 to C4 show pitch laws for turbine engines in accordance with the embodiment in FIG. 12, in which the rotation axes 62 of the links 36b are offset upstream with respect to the rotation axes 48 of the links 36a, respectively for distances d2, d3 and d4, in which d4 is greater than d3, itself greater than d2.

It will be noted that the pitch laws C2 to C4 are different from the pitch law of the curve C1.

The curve C5 shows a pitch law for a turbine engine according to the embodiment in FIG. 13 in which, apart from the offset upstream, the circumferential distance cb between the centre of the pivot 30 and the rotation axis 62 of each link 36b is different from the circumferential distance ca between the centre of the pivot 30 and the rotation axis 48 of each link 36a. It will be noted there also that the pitch law C5 obtained is different from the pitch laws C1 to C4.

The invention thus makes it possible to adapt the pitch law of each stator blade or of each group of stator blades according to their azimuthal position.

It will be possible to envisage, according to the heterogeneity of the flow, making provision for axially offsetting, downstream and/or upstream and/or azimuthally on the same ring, the position of the rotation axis of the links.

What is claimed is:

1. A turbine-engine compressor, extending along a longitudinal axis, comprising an annular casing and at least one annular row of variable-pitch blades, each blade comprising a radially external end comprising a pivot mounted in an orifice in the casing, each blade connected by a link to a control ring able to pivot axially with respect to the casing, each link comprising a first end fixed to the pivot of the blade and a second end mounted pivotally on the control ring, wherein pivot axes of first and second links of the at least one annular row of variable-pitch blades connected to the control ring are offset from each other along the longitudinal axis of the compressor, the second end of the second link being mounted so as to be able to slide in a recess with a complementary shape in a connecting member, the connecting member being mounted so as to be able to pivot with respect to the control ring about a radial axis so as to form a sliding pivot type connection between the second link and the control ring, wherein the recess is a hole passing through said connecting member.

2. The compressor according to claim 1, wherein the pivot axis of the second end of the second link is offset axially downstream with respect to the pivot axis of the second end of the first link, in a direction of flow of gases in the compressor.

3. A turbine engine comprising at least one compressor according to claim 1.

\* \* \* \* \*